(12) United States Patent
Simmons et al.

(10) Patent No.: US 9,411,472 B2
(45) Date of Patent: Aug. 9, 2016

(54) TOUCH SENSOR WITH ADAPTIVE TOUCH DETECTION THRESHOLDING

(75) Inventors: Martin John Simmons, Southampton (GB); Darren Golbourn, Southampton (GB); Daniel Pickett, Southampton (GB)

(73) Assignee: Atmel Corporation, San Jose, CA (US)

( * ) Notice: Subject to any disclaimer, the term of this patent is extended or adjusted under 35 U.S.C. 154(b) by 189 days.

(21) Appl. No.: 13/314,858

(22) Filed: Dec. 8, 2011

(65) Prior Publication Data

US 2013/0147752 A1    Jun. 13, 2013

(51) Int. Cl.
*G06F 3/045* (2006.01)
*G06F 3/044* (2006.01)

(52) U.S. Cl.
CPC ...................................... *G06F 3/044* (2013.01)

(58) Field of Classification Search
USPC ............ 178/18.06, 18.01; 324/658, 678, 688; 341/20; 345/173, 174; 361/103; 702/57
See application file for complete search history.

(56) References Cited

U.S. PATENT DOCUMENTS

| | | | | |
|---|---|---|---|---|
| 7,663,607 B2 * | 2/2010 | Hotelling | ............... | G06F 3/0416 178/18.01 |
| 7,875,814 B2 | 1/2011 | Chen | | |
| 7,920,129 B2 * | 4/2011 | Hotelling | ............... | G06F 3/0416 178/18.01 |
| 8,031,094 B2 * | 10/2011 | Hotelling | ............... | H03M 3/494 341/139 |
| 8,031,174 B2 * | 10/2011 | Hamblin | ............... | G06F 1/1626 345/158 |
| 8,040,326 B2 | 10/2011 | Hotelling | | |
| 8,049,732 B2 * | 11/2011 | Hotelling | ................ | G06F 3/044 178/18.01 |
| 8,077,160 B2 * | 12/2011 | Land et al. | ..................... | 345/173 |
| 8,179,381 B2 | 5/2012 | Frey | | |
| 8,339,286 B2 * | 12/2012 | Cordeiro | ............... | G06F 3/0418 341/20 |
| 2008/0158146 A1 * | 7/2008 | Westerman | ............. | G06T 7/401 345/156 |
| 2009/0315854 A1 | 12/2009 | Matsuo | | |
| 2010/0060608 A1 * | 3/2010 | Yousefpor | ...................... | 345/174 |
| 2010/0073301 A1 * | 3/2010 | Yousefpor | ............... | G06F 3/044 345/173 |
| 2011/0012840 A1 * | 1/2011 | Hotelling | .............. | G06F 3/0418 345/173 |
| 2011/0015889 A1 * | 1/2011 | Land | ..................... | G06F 3/0418 702/104 |
| 2011/0074725 A1 * | 3/2011 | Westerman | ........... | G06F 3/0418 345/174 |

(Continued)

FOREIGN PATENT DOCUMENTS

WO    WO 2012/129247    9/2012

OTHER PUBLICATIONS

Analog Devices, Inc., AD7143—Product Specification Sheet for Programmable Controller for Capacitance Touch Sensors, 56 pages, Rev 0, Jan. 2007.*

(Continued)

*Primary Examiner* — Kathy Wang-Hurst
*Assistant Examiner* — Douglas M Wilson
(74) *Attorney, Agent, or Firm* — Baker Botts L.L.P.

(57) ABSTRACT

In one embodiment, a method includes receiving, by a controller coupled to a touch sensor, a plurality of signals from a plurality of sense electrodes, the plurality of signals indicative of an amount of capacitance between the touch sensor and an external object. The method further includes accessing a stored threshold value, determining a strength of a charge return path between the touch sensor and a ground, and adjusting the stored threshold value based on the determined strength of the charge return path. The threshold value indicates a threshold magnitude of the signals from the plurality of sense electrodes to process as a touch by the external object.

23 Claims, 7 Drawing Sheets

(56) References Cited

U.S. PATENT DOCUMENTS

2012/0242588 A1 9/2012 Myers
2012/0242592 A1 9/2012 Rothkopf
2012/0243151 A1 9/2012 Lynch
2012/0243719 A1 9/2012 Franklin

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

TOUCH SENSOR WITH ADAPTIVE TOUCH DETECTION THRESHOLDING

TECHNICAL FIELD

This disclosure generally relates to touch sensors.

BACKGROUND

A touch sensor detects the presence and location of a touch or the proximity of an object (such as a user's finger or a stylus) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

DESCRIPTION OF EXAMPLE EMBODIMENTS

A touch sensor may be utilized by a device such as a tablet computer, personal digital assistant (PDA), smartphone, portable media player, or any other device to detect the presence and location of a touch or the proximity of an object (such as a user's finger or a stylus) to the device. Devices having touch sensors may be utilized in various different grounding scenarios. For example, a device with a touch sensor may be utilized in a "floating" environment (e.g., an environment where the device is not grounded at all or only has a weak path to ground) such as when a user is interacting with the touch screen of the device as it is sitting on a table or is mounted on a wall. In another scenario, a device with a touch sensor may be utilized in a "grounded" environment (e.g., an environment where the device has a good path to ground) such as when a user is holding the device with one hand and touching the touch screen of the device with the other hand, or when the device is plugged into another system while the user is touching the touch screen (i.e., the device is plugged into a power source for charging or the device is plugged into a computer system for data synchronization). Depending on factors such as the design of the touch sensor and/or size of the object touching the touch sensor, the differences in signals measured by the touch sensor may vary between floating or grounded by up to 30% or more.

Typically, touch sensors are configured with a single touch detection threshold that is used to determine whether an object is touching the touch sensor. The value of this touch detection threshold is usually pre-programmed to a fixed value that is a balance between not being too high and therefore not detecting touches in the floating scenario, and not being too low and therefore detecting false touches by picking up noise in the grounded scenario. In practice, selecting a proper detection threshold can be very difficult and often results in touch sensors not accurately detecting touches in all grounding scenarios.

The teachings of the disclosure recognize that it would be desirable to provide a touch sensor that has a touch detection threshold that automatically adapts to various grounding scenarios. FIGS. 1 through 7 below illustrate a touch sensor with adaptive touch detection thresholding according to the teachings of the disclosure.

Figure 1:
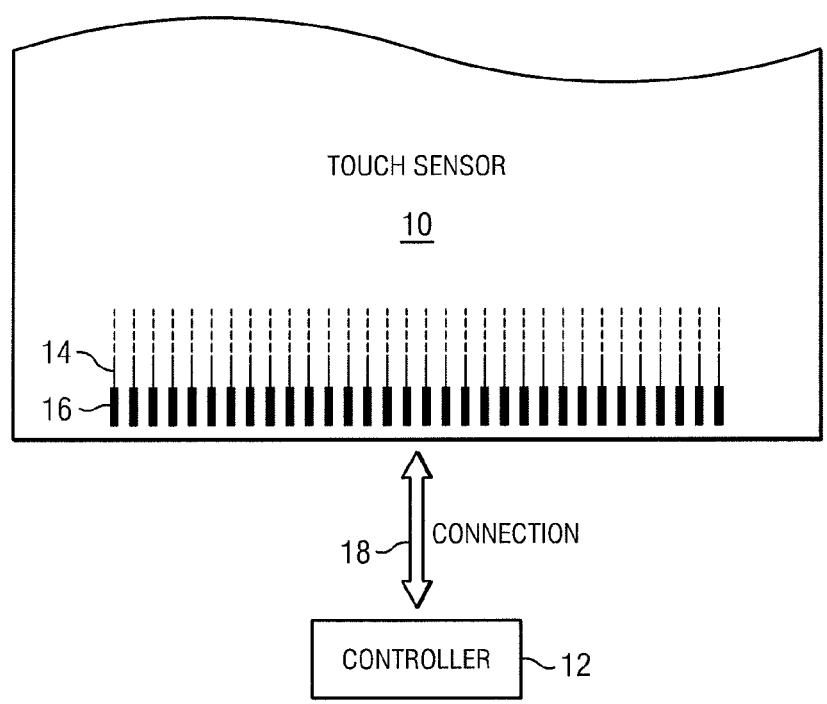
FIG. 1 illustrates an example touch sensor, according to certain embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate. Touch sensor 10 includes one or more touch-sensitive areas, where appropriate. Touch sensor 10 includes an array of drive and sense electrodes disposed on a substrate, which in some embodiments is a dielectric material.

In certain embodiments, one or more portions of the substrate of touch sensor 10 are made of polyethylene terephthalate (PET) or another suitable material. This disclosure contemplates any suitable substrate with any suitable portions made of any suitable material. In particular embodiments, the drive or sense electrodes in touch sensor 10 are made of indium tin oxide (ITO) in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 µm or less and a width of approximately 10 µm or less. As another example, one or more portions of the conductive material are silver or silver-based and similarly have a thickness of approximately 5 µm or less and a width of approximately 10 µm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes. In certain embodiments, a drive electrode and a sense electrode form a capacitive node. The drive and sense electrodes forming the capacitive node come near each other, but do not make electrical contact with each other. Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

In certain embodiments, touch sensor 10 has a single-layer configuration, with drive and sense electrodes disposed in a pattern on one side of a substrate. In such a configuration, a pair of drive and sense electrodes capacitively coupled to each other across a space between them forms a capacitive node. In a single-layer configuration for a self-capacitance implementation, electrodes of only a single type (e.g. drive) are disposed in a pattern on one side of the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. Certain embodiments of controller 12 include a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 are copper or copper-based and have a width of approximately 100 µm or less. As another example, the conductive material of tracks 14 are silver or silver-based and have a width of approximately 100 µm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2:
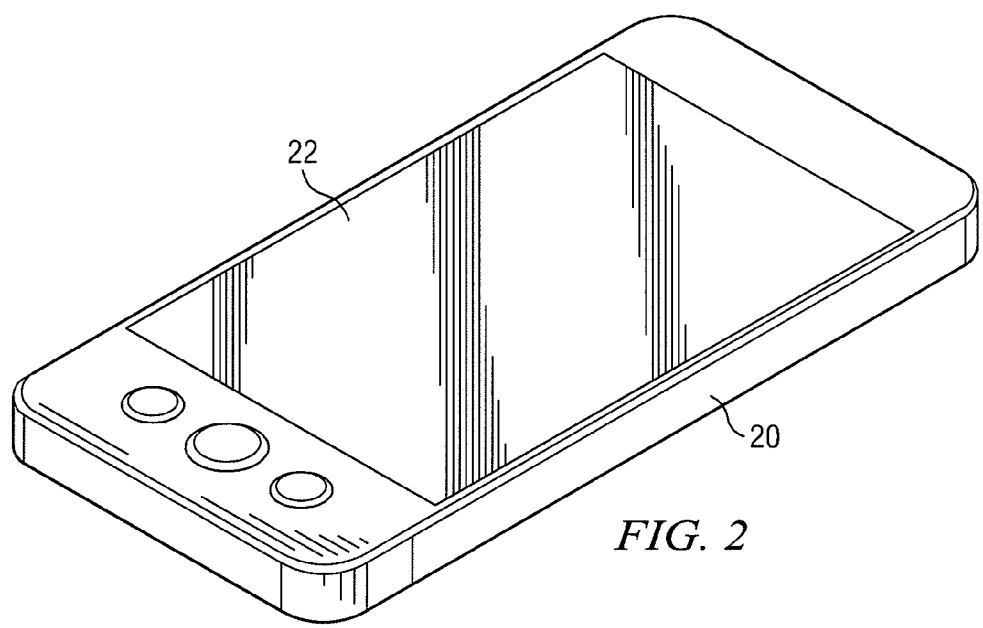
FIG. 2 illustrates an example device that utilizes the touch sensor of FIG. 1, according to certain embodiments.

FIG. 2 illustrates an example device 20 that utilizes touch sensor 10 of FIG. 1. Device 20 includes any personal digital assistant, cellular telephone, smartphone, tablet computer, and the like. In certain embodiments, device 20 includes other applications such as automatic teller machines (ATMs), home appliances, personal computers, and any other such device having a touchscreen. For example, a certain embodiment of device 20 is a smartphone that includes a touchscreen display 22 occupying a significant portion of the largest surface of the device. In certain embodiments, the large size of touchscreen display 22 enables the touchscreen display 22 to present a wide variety of data, including a keyboard, a numeric keypad, program or application icons, and various other interfaces as desired. A user interacts with device 20 by touching touchscreen display 22 with a stylus, a finger, or any other appropriate object in order to interact with device 20 (i.e., select a program for execution or to type a letter on a keyboard displayed on the touchscreen display 22). In certain embodiments, a user interacts with device 20 using multiple touches to perform various operations, such as to zoom in or zoom out when viewing a document or image. In some embodiments, such as home appliances, touchscreen display 22 does not change or changes only slightly during device operation, and recognizes only single touches.

Figure 3:
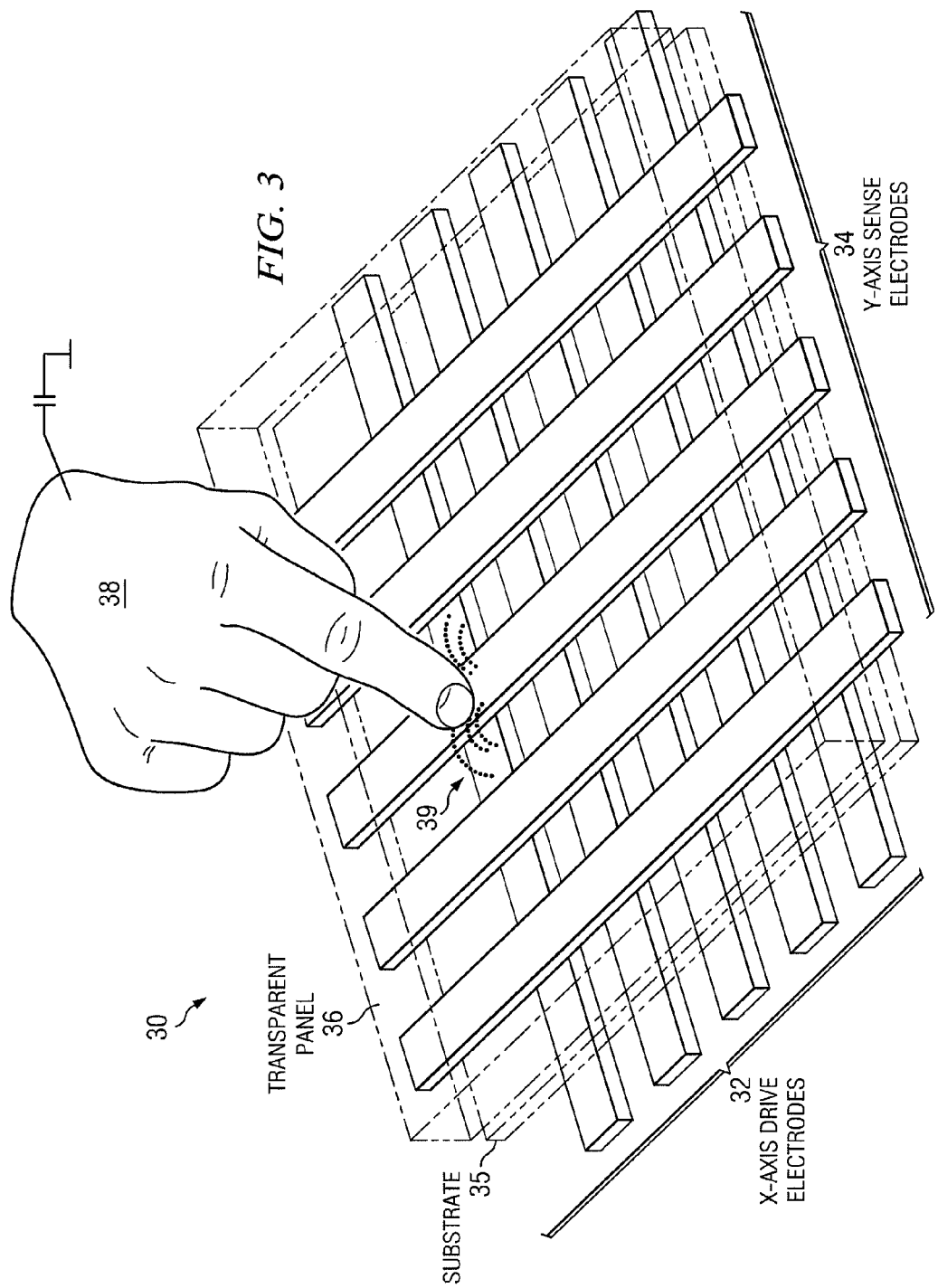
FIG. 3 illustrates an example embodiment of the touch sensor of FIG. 1, according to certain embodiments.

FIG. 3 illustrates an example touch sensor 30 that may be utilized as touch sensor 10 of FIG. 1. Touch sensor 30 includes drive electrodes 32, sense electrodes 34, a substrate 35, and a panel 36. In some embodiments, panel 36 is a transparent panel. In the illustrated embodiment, substrate 35 is sandwiched between drive electrodes 32 and sense electrodes 34, and sense electrodes 34 are coupled to an underside of panel 36 with, for example, an adhesive. In other embodiments, touch sensor 30 includes any appropriate configuration and number of layers of electrodes and substrates. For example, some embodiments of touch sensor 30 include additional layers of sense electrodes 32 that run perpendicular (or any other appropriate angle) to sense electrodes 34.

In certain embodiments, electrodes 32 and 34 are configured in a manner substantially similar to the drive and sense electrodes, respectively, described above with reference to FIG. 1, and touch object 38 is capacitively coupled to ground. Touch sensor 30 determines the location of touch object 38 at least in part by using controller 12 to apply a pulsed or alternating voltage to drive electrodes 32, which induces a charge on sense electrodes 34. When touch object 38 touches or comes within proximity of an active area of touch sensor 30, a change in capacitance may occur, as depicted by electric field lines 39 in FIG. 3. The change in capacitance is sensed by sense electrodes 34 and measured by controller 12. By measuring changes in capacitance throughout an array of sense electrodes 34, controller 12 determines the position of the touch or proximity within the touch-sensitive area(s) of touch sensor 30.

As discussed above, a device 20 having a touch sensor such as touch sensor 30 may be utilized in various grounding scenarios. For example, device 20 may be lying on a surface such as a table while a user is interacting with touchscreen display 22. In this scenario, device 20 may be considered "floating" since it has no or a weak path to ground. In another scenario, device 20 may be plugged into a power or synchronization cable or may be held in a user's hand while a finger on the user's other hand is touching touchscreen display 22. In this scenario, device 20 may be considered "grounded" since it has a strong path to ground. FIGS. 4A-4B and 5A-5B below further describe various grounding scenarios in which device 20 may be utilized.

Figure 4A:
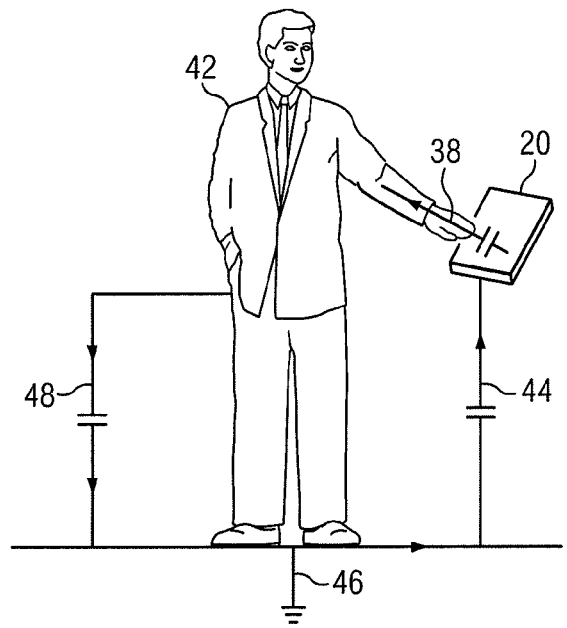
FIGS. 4A and 4B illustrate example grounding scenarios in which the device of FIG. 2 may be utilized, according to certain embodiments.
Figure 4B:
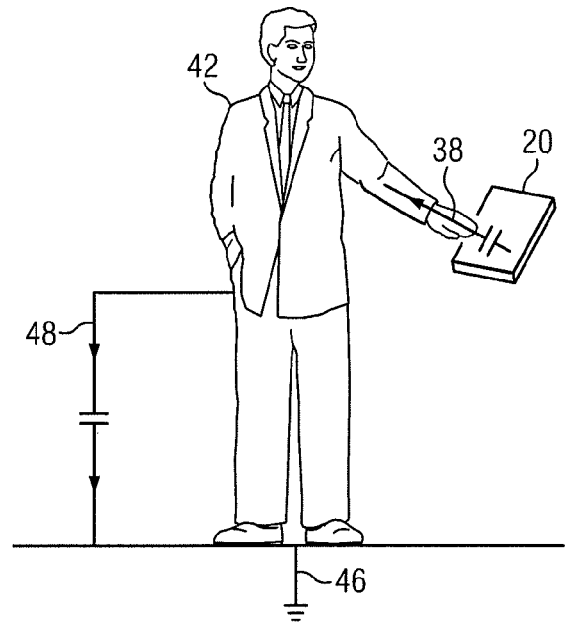

FIGS. 4A and 4B illustrate example grounding scenarios in which device 20 may be utilized. In FIG. 4A, device 20 is utilized in a grounded scenario. In this scenario, device 20 is grounded by having a strong or direct path 44 to ground 46. For example, certain embodiments of path 44 to ground 46 include a power cable connecting device 20 to a power receptacle, a synchronization cable connecting device 20 to another computer system, a hand of user 42 other than the hand of user 42 that is interacting with device 20, and the like. As described in more detail below, capacitance changes detected by touch sensor 30 of device 20 due to touch object 38 interacting with device 20 may be larger in magnitude than in scenarios where device 20 is floating.

FIG. 4B illustrates a scenario where device 20 is floating. In this scenario, device 20 is floating because it does not have a strong or direct path 44 to ground 46 (i.e., it is not connected to a power cable or a synchronization cable). For example, device 20 may be lying on a table or other surface while user 42 is touching touchscreen display 22 of device 20. As another example, device 20 may be mounted on a wall while user 42 is touching touchscreen display 22 of device 20. As described in more detail below, capacitance changes detected by touch sensor 30 of device 20 due to touch object 38 interacting with device 20 may be smaller in magnitude than in scenarios where device 20 is grounded.

Figure 5A:
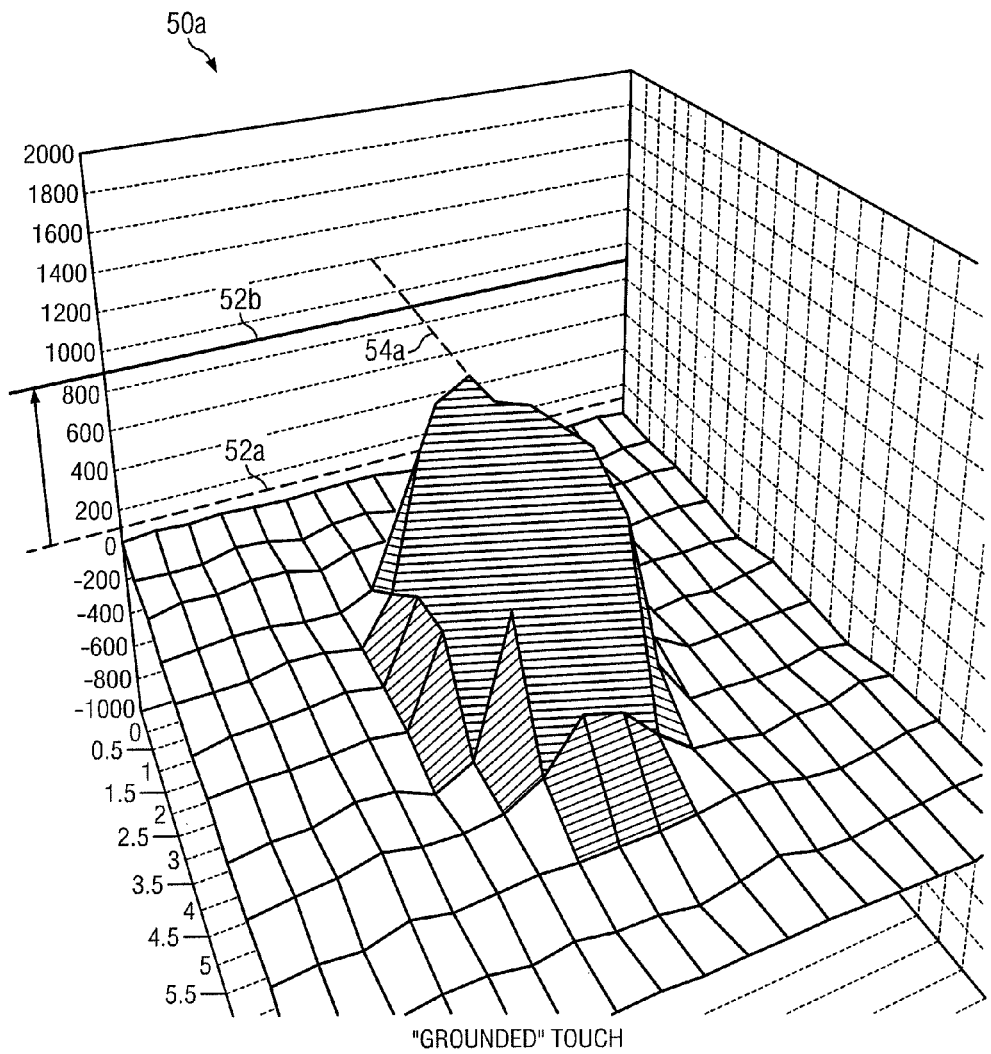
FIGS. 5A and 5B illustrate example capacitance graphs representing capacitance measurements by the touch sensor of FIG. 1, according to certain embodiments.

FIG. 5A illustrates an example capacitance graph 50a representing capacitance measurements by touch sensor 30 due to touch object 38 touching or coming in close proximity to touch sensor 30 while device 20 is grounded. FIG. 5A includes an x-axis, a y-axis, and a z-axis, as illustrated. The x-axis is the y-axis sense electrodes, and the y-axis is the x-axis drive electrodes. The z-axis indicates the measured change in capacitance. Capacitance graph 50a illustrates a relatively uniform spike in measured capacitance having a maximum magnitude 54a of approximately 1200. Capacitance graph 50a also illustrates touch detection thresholds 52 (e.g., touch detection threshold 52a and 52b) which indicate a threshold magnitude of the signals from sense electrodes 34 to process as a touch by the external object. Touch detection thresholds 52 may be stored in any memory device accessible to touch sensor 30 and may be referred to herein as a "stored threshold value." For illustrative purposes only, consider touch sensor 30 having an initial touch detection threshold 52a of 100, as illustrated in FIG. 5A. In this example, touch sensor 30 determines that the interaction with device 20 that resulted in the illustrated capacitance graph 50a is a touch of touchscreen display 22 because maximum magnitude 54a of 1200 is greater than touch detection threshold 52a of 100. Conversely, if maximum magnitude 54a is determined to be less than touch detection threshold 52a, touch sensor 30 determines that the interaction with device 20 that resulted in the illustrated capacitance graph 50a is not a touch of touchscreen display 22. However, if touch detection threshold 52 is set at too low of a value while device 20 is grounded, touch sensor 20 may falsely identify noise as a touch. Embodiments of the disclosure dynamically adjust touch threshold 52 to account for various grounding scenarios device 20 may encounter. In the illustrated capacitance graph 50a of FIG. 5a, for example, touch sensor 30 adjusts initial touch detection threshold 52a up to new touch detection threshold 52b when it determines device 20 is grounded in order to avoid falsely detecting noise as touches. The new touch detection threshold 52b is determined as described below and in general is a value that is high enough to avoid detecting noise as touches but low enough that the maximum magnitude of the capacitance detected by sense electrodes 34 while device 20 is grounded will be greater than new touch detection threshold 52b. As a result, embodiments of the disclosure provide improved detection of touches in all grounding scenarios.

Figure 5B:
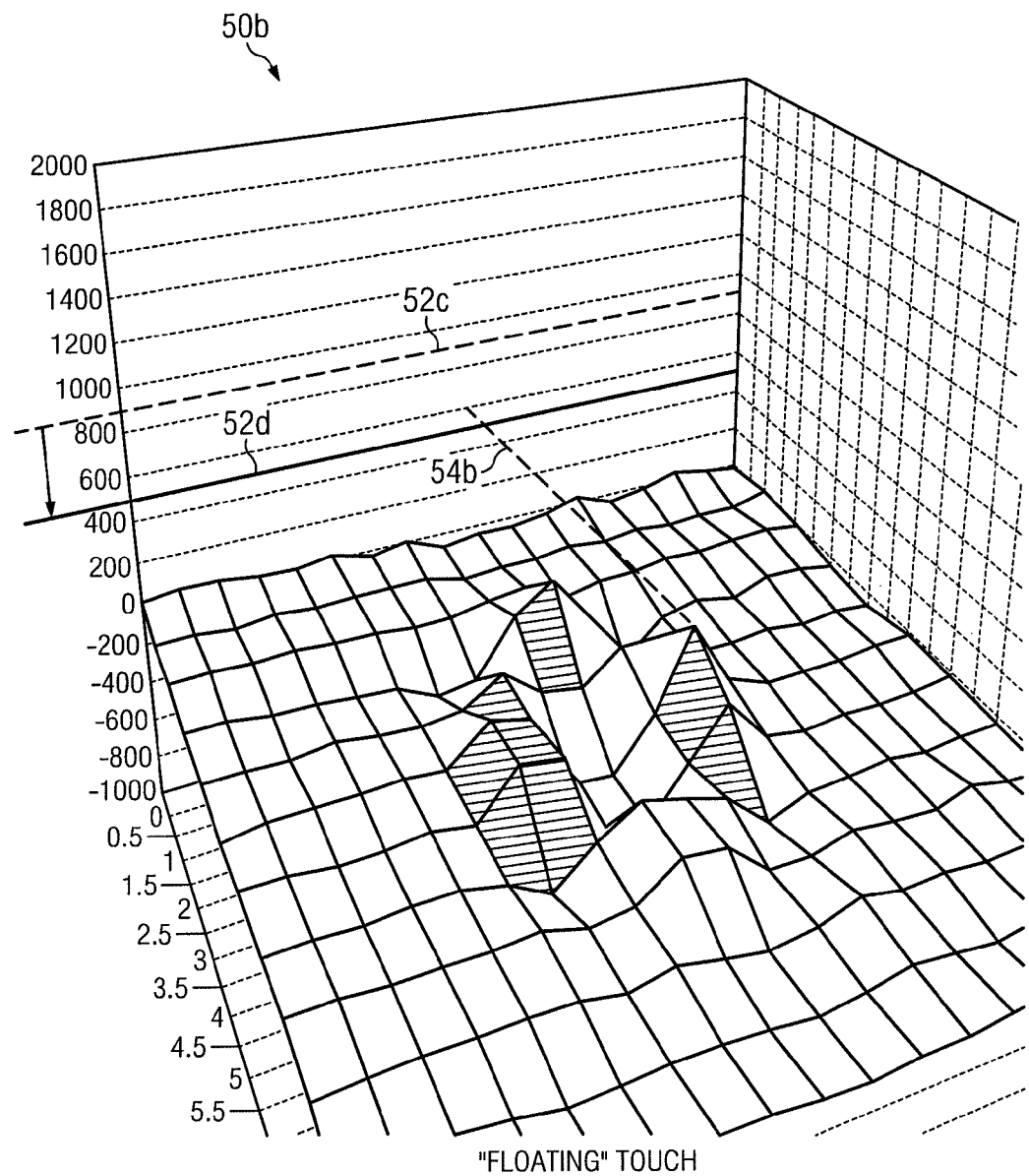

FIG. 5B illustrates an example capacitance graph 50b representing capacitance measurements by touch sensor 30 due to touch object 38 touching or coming in close proximity to touch sensor 30 while device 20 is floating. FIG. 5B includes an x-axis, a y-axis, and a z-axis, as illustrated. The x-axis is the y-axis sense electrodes, and the y-axis is the x-axis drive electrodes. The z-axis indicates the measured change in capacitance. Capacitance graph 50b illustrates a non-uniform spike in measured capacitance having a maximum magnitude 54b of approximately 600. In this example, touch sensor 30 determines that the interaction with device 20 that resulted in the illustrated capacitance chart 50b is not a touch of touchscreen display 22 because maximum magnitude 54b of 600 is less than initial touch detection threshold 52c of 900. However, this may result in an undetected touch if the interaction with device 20 that resulted in the illustrated capacitance chart 50b was intended to be a touch. That is, a touch of touchscreen display 22 when device 20 is floating may result in maximum magnitude 54b being less than touch detection threshold 52c. Embodiments of the disclosure, however, dynamically adjust touch threshold 52 to account for various grounding scenarios device 20 may encounter in order to correctly detect touches in floating scenarios. In the illustrated capacitance graph 50b of FIG. 5b, for example, touch sensor 30 adjusts initial touch detection threshold 52c of 900 down to new touch detection threshold 52d of 500 when it determines device 20 is in a floating scenario in order to detect subsequent touches when device 20 is floating. As a result, embodiments of the disclosure provide improved detection of touches in all grounding scenarios.

In operation of example embodiments, an external object such as touch object 38 contacts or comes within close proximity to touch sensor 30. For example, user 42 interacts with device 20 by touching touchscreen display 22 with a finger or a stylus. As a result of the interaction, touch sensor 30 receives signals from sense electrodes 34 that indicate of an amount of capacitance between touch sensor 30 and the external object. For example, touch sensor 30 receives signals from sense electrodes 34 indicating an amount of capacitance between touch sensor 30 and a finger of user 42 that is being used to interact with device 20. In another example, touch sensor 30 receives signals from sense electrodes 34 indicating an amount of capacitance between touch sensor 30 and a stylus that is being used by user 42 to interact with device 20.

In response to receiving the signals from sense electrodes 34 that indicate an amount of capacitance between touch sensor 30 and the external object, some embodiments of touch sensor 30 access a threshold value such as touch detection threshold 52 that is stored in one or more memory devices accessible to controller 12. The threshold value indicates a threshold magnitude of the signals from sense electrodes 34 to process as a touch by the external object. For example, as illustrated in FIGS. 5A and 5B, touch detection threshold 52 indicates a threshold magnitude of capacitance that is compared to the capacitance measured by sense electrodes 34. If the measured capacitance is greater than touch detection threshold 52, the interaction with device 20 is considered a touch. Conversely, if the measured capacitance is less than touch detection threshold 52, the interaction with device 20 is considered to not be a touch.

In certain embodiments, touch sensor 30 determines the strength of the charge return path between touch sensor 30 and ground 46 in order to determine whether device 20 is grounded or floating and consequently whether the stored threshold value should be adjusted. For example, some embodiments of touch sensor 30 determine whether device 20 is currently connected to another device or system via a cable. In certain embodiments, touch sensor 30 communicates with software running on device 20 (i.e., an operating system of device 20) to determine whether device 20 is currently charging (and is therefore connected via a power cable to a power source) and/or if device 20 is currently connected to another computer system for synchronization (i.e., device 20 is connected to a computer via a cable such as a Universal Serial Bus (USB) cable). In certain embodiments, touch sensor 30 determines that device 20 is grounded if it is determined that device 20 is connected to another device or system via a cable. As a result of determining that device 20 is grounded, certain embodiments of touch sensor 30 adjust the stored threshold value to accommodate higher capacitance magnitudes that are measured by sense electrodes 34 when device 20 is grounded.

In some embodiments, touch sensor 30 determines the strength of the charge return path between touch sensor 30 and ground 46 by determining the location in which touch object 38 touched touchscreen display 22 and correlating the location with locations in which sense electrodes 34 and drive electrodes 32 intersect. For example, as described in more detail below in reference to FIGS. 6A and 6B, some embodiments of touch sensor 30 determine the maximum capacitance magnitude of a touch that at least partially covers the location in which sense electrodes 34 and drive electrodes 32 intersect. Some embodiments then utilize this maximum capacitance magnitude to calculate a new threshold value to use for subsequent touches.

Figure 6A:
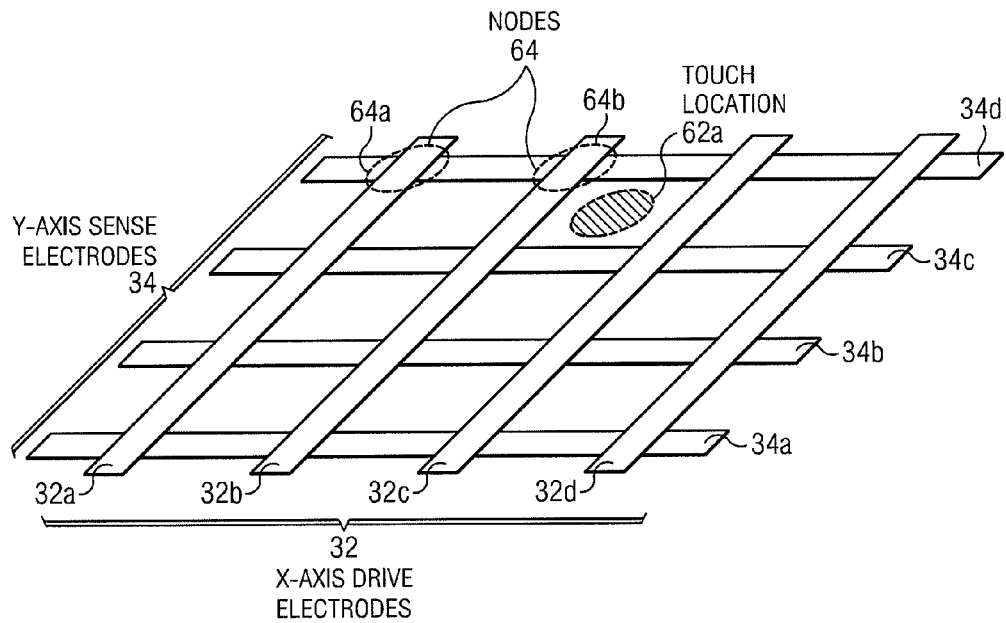
FIGS. 6A and 6B illustrate further example embodiments of the touch sensor of FIG. 1, according to certain embodiments.
Figure 6B:
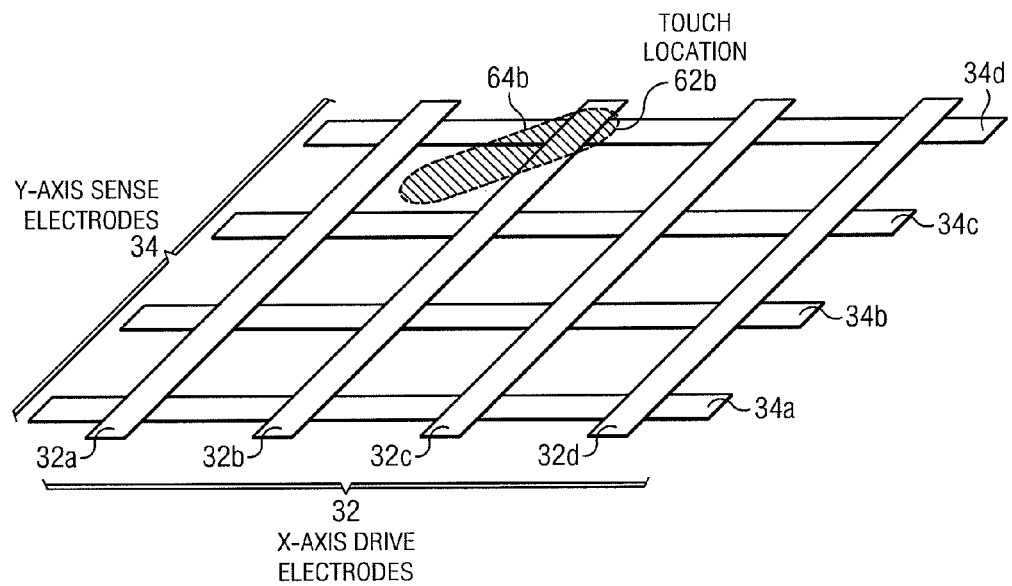

FIGS. 6A and 6B illustrate example embodiments of touch sensor 30 having a grid of x-axis drive electrodes 32 and y-axis sense electrodes 34 and illustrate a detection of a change in capacitance due to a touch object 38 touching or coming in close proximity to touch sensor 30. As illustrated in FIGS. 6A and 6B, certain embodiments of touch sensor 30 include multiple electrodes 32/34 arranged substantially parallel to either the x-axis or y-axis. In certain embodiments, the x-axis is not parallel to the y-axis (e.g. the x-axis is rotated with respect to the y-axis about an angle of approximately 90 degrees, 120 degrees, 130 degrees, or any other suitable angle). In the illustrated embodiment, electrodes 32 and 34 collectively form a substantially two-dimensional grid configuration. Electrodes 32 and 34 visually intersect each other (but do not physically touch each other) at nodes 64. For example, when viewed from above, x-axis drive electrode 32a intersects y-axis sense electrode 34d at node 64a. As another example, x-axis drive electrode 32b intersects y-axis sense electrode 34d at node 64b.

Although the example touch sensors 30 of FIGS. 6A and 6B are configured as a rectangular grid, other configurations are within the scope of the invention, such as a touchwheel, a linear slider, buttons with reconfigurable displays, and other like configurations. In certain embodiments, redundant fine line metal electrodes to provide open fault resiliency are applied to any such configuration, and the disclosure is not limited to the example configurations presented here.

In operation of example embodiments of FIGS. 6A and 6B, a touch object 38 comes in close proximity to or physically touches touch sensor 30 (i.e., touchscreen display 22) at locations 62. For example, a stylus comes within close enough proximity to touch sensor 30 at location 62a to cause a detectable change in capacitance across electrodes 32/34, but does not physically contact panel 36. As another example, a finger of user 42 touches and moves across touchscreen display 22 at location 62b and thus causes a detectable change in capacitance across electrodes 32/34. Electrodes 32/34 detect the change in capacitance due to touch object 38 and communicate signals indicating the change in capacitance to controller 12. As described in more detail below, once controller 12 receives change in capacitance measurements from electrodes 32/34, some embodiments of controller 12 utilize locations 62 and nodes 64 in order to determine whether device 20 is grounded or floating and consequently whether the stored threshold value should be adjusted.

In one embodiment, touch sensor 30 determines whether location 62 at least partially covers a node 64 in order to determine whether the stored threshold value should be adjusted. For example, in the illustrated embodiment of FIG. 6A, certain embodiments of touch sensor 30 determine that location 62a does not cover any portion of any node 64 and thus determine that the capacitance measurements associated with the touch at location 62a should not be used to adjust the stored threshold value. As another example, in the illustrated embodiment of FIG. 6B, certain embodiments of touch sensor 30 determine that at least a portion of location 62b covers at least a portion of node 64b. As a result, touch sensor 30 determines that the capacitance measurements associated with the touch at location 62b that covers node 64b should be used to adjust the stored threshold value. As an example for illustrative purposes only, if touch sensor 30 determines that the maximum magnitude of the measured capacitance associated with touch location 62b over node 64b is 1200, touch sensor 30 calculates a new threshold value by multiplying 1200 by a certain predetermined percentage (i.e., 50%, 60%, or any other appropriate predetermined percentage). Touch sensor 30 then stores the new threshold value in memory to be used to determine whether subsequent capacitance changes detected by touch sensor 30 due to subsequent interactions with device 20 should be interpreted as touches. As a result, touch sensor 30 adjusts the stored threshold value based on the determined strength of the charge return path.

In some embodiments, touch sensor 30 determines the strength of the charge return path between touch sensor 30 and ground 46 by analyzing the geometry of the shape of one or more capacitance graphs. For example, certain embodiments of touch sensor 30 determine whether device 20 is grounded or floating by comparing one or more capacitance graphs associated with one or more interactions with device 20 with a predetermined shape. For example, FIGS. 5A and 5B above illustrate example capacitance graphs that are associated with one or more interactions with device 20. As illustrated in these figures, a touch of device 20 when it is grounded (e.g. FIG. 5A) results in a spike in measured capacitance that is larger and more concentrated than a touch of device 20 when it is floating. Conversely, when device 20 is floating, the capacitance graph of a touch (e.g. FIG. 5B) is generally smaller in magnitude and more dispersed than when device 20 is grounded. Certain embodiments of touch sensor 30 store in memory capacitance graphs of example grounded touches and floating touches (i.e., capacitance graphs similar to the capacitance graphs illustrated in FIGS. 5A and 5B) and then compare capacitance graphs associated with subsequent interactions with device 20 with the stored capacitance graphs. In some embodiments, if a certain number of capacitance graphs of subsequent interactions with device 20 within a certain amount of time are similar in shape to a stored capacitance graph associated with device 20 being grounded (i.e., have capacitance spikes with an area that is within a certain percentage of the area of capacitance spikes in the stored capacitance graph), touch sensor 30 determines that device 20 is grounded and adjusts the stored threshold value accordingly. For example, if touch sensor 30 determines that device 20 is grounded, the stored threshold value is adjusted to a value that is a certain percentage of a maximum capacitance magnitude for known grounded touches. Conversely, if a certain number of capacitance graphs of subsequent interactions with device 20 within a certain amount of time are similar in shape to a stored capacitance graph associated with a floating device 20, touch sensor 30 determines that device 20 is floating and adjusts the stored threshold value accordingly. For example, if touch sensor 30 determines that device 20 is floating, the stored threshold value is adjusted to a value that is a certain percentage of a maximum capacitance magnitude for known floating touches.

In certain embodiments, touch sensor 30 adjusts the stored threshold value based on the determined strength of the charge return path as discussed herein. In some embodiments, adjusting the stored threshold value includes storing a calculated new threshold value as the stored threshold value. In some embodiments, adjusting the stored threshold value includes replacing the stored threshold value with a new threshold value. In certain embodiments, the stored threshold value is adjusted at a predetermined rate. For example, in certain embodiments the stored threshold value is adjusted at a periodic time interval. In certain embodiments, the stored threshold value is adjusted after a certain predetermined number of interactions with device 20.

In some embodiments, touch sensor 30 periodically drifts the threshold value back to an original threshold value when touch sensor 30 is not tracking any interactions with device 20. If touch sensor 30 does not detect any interactions with device 20 within a predetermined amount of time after an initial touch detection threshold 52 has been adjusted to a new touch detection threshold 52, touch sensor 30 periodically adjusts touch detection threshold 52 back to its initial value at a predetermined rate. As an example for illustrative purposes only, consider FIG. 5B where initial touch detection threshold 52c of 900 was adjusted to new touch detection threshold 52d of 500. In this example, certain embodiments of touch sensor 30 start a timer after initial touch detection threshold 52c is adjusted to new touch detection threshold 52d of 500. If the timer reaches a certain predetermined time without touch sensor 30 detecting any subsequent interactions with touch sensor 30, touch detection threshold 52 is periodically adjusted back to initial touch detection threshold 52c of 900 at a predetermined rate. For example, in one embodiment, touch detection threshold 52 is adjusted to 600 after one second, to 700 after two seconds, to 800 after three seconds, and finally back to 900 after four seconds if no interactions with touch sensor 30 are detected. After adjusting touch detection threshold 52 back to initial touch detection threshold 52c of 900, touch sensor 30 stops adjusting touch detection threshold 52 until a subsequent interaction with touch sensor 30 is detected. While certain embodiments of touch sensor 30 drift the threshold value back to an initial value at the predetermined rate discussed above, the disclosure anticipates any appropriate rate of adjustment.

Figure 7:
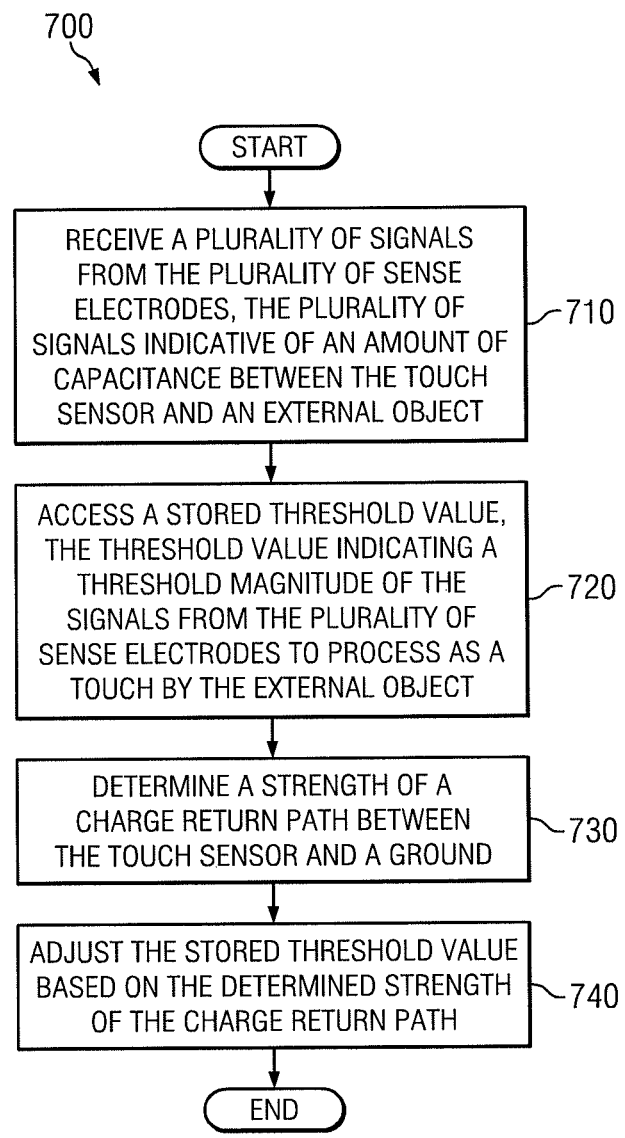
FIG. 7 illustrates an example method that may be used in certain embodiments to provide adaptive touch detection thresholding, according to certain embodiments.

FIG. 7 illustrates an example method 700 that is used in certain embodiments to provide adaptive touch detection thresholding. Method 700 begins in step 710 where a plurality of signals from sense electrodes is received. In some embodiments, the received signals are indicative of an amount of capacitance between a touch sensor and an external object. In certain embodiments, the touch sensor refers to touch sensor 10 or touch sensor 30 described above. In certain embodiments, the sense electrodes refer to sense electrodes 34 described above. In some embodiments, the external object is any object that touches or comes in close proximity to the touch sensor such as a user's finger, a stylus, and the like.

In step 720, a stored threshold value is accessed. In certain embodiments, the stored threshold value refers to touch detection threshold 52 described above. In some embodiments, the threshold value indicates a threshold magnitude of the signals received from the plurality of sense electrodes in step 710 to process as a touch by the external object. In certain embodiments, the stored threshold value is stored in one or more memory devices accessible to the touch sensor.

In step 730, a strength of a charge return path between the touch sensor and ground is determined. In certain embodiments, the strength of the charge return path between the touch sensor and ground refers to determining whether a device is which the touch sensor resides is grounded or floating. In some embodiments, the strength of the charge return path between the touch sensor and ground is determined by determining that the external object has touched the touch sensor at a location that at least partially covers a node of the touch sensor, determining a maximum magnitude of a particular signal received from sense electrodes associated with the node, and calculating a new threshold value using the determined maximum magnitude of the particular signal received from sense electrodes associated with the particular node. In some embodiments, the new threshold value is calculated by multiplying the determined maximum magnitude of the particular signal received from sense electrodes associated with the node by a predetermined percentage. In certain embodiments, the stored threshold value is adjusted by storing the calculated new threshold value as the stored threshold value.

In some embodiments, the strength of the charge return path between the touch sensor and ground in step 730 is determined by determining whether a device such as device 20 is plugged into a cable that provides grounding for device 20. In certain embodiments, step 730 includes communicating with software running on device 20 to determine whether device 20 is currently charging via a power cable or whether device 20 is currently coupled to another computer system via a synchronization cable. In certain embodiments, if it is determined in step 730 that device 20 is currently plugged into a cable that provides grounding for device 20, it is determined that device 20 is in a grounded scenario. In some embodiments, it is determined that device 20 is floating if it is determined that device 20 is not currently plugged into a cable that provides grounding for device 20.

In step 740, the stored threshold value is adjusted based on the strength of the charge return path determined in step 730. In some embodiments, the stored threshold value is adjusted to a certain percentage of a maximum magnitude of a particular signal received from the sense electrodes. In certain embodiments, the stored threshold value is replaced with a new threshold value. In some embodiments, the stored threshold value is adjusted at a predetermined rate. After step 740, method 700 ends.

Accordingly, example embodiments disclosed herein provide a touch sensor that has a touch detection threshold that is automatically adapted for various grounding scenarios. For example, certain devices automatically adjust its touch detection threshold based on a determination of whether the device is grounded or floating. Accordingly, embodiments of the disclosure provide enhanced touch detection in all possible grounding scenarios.

Although the preceding examples given here generally rely on self capacitance or mutual capacitance to operate, other embodiments of the invention will use other technologies, including other capacitance measures, resistance, or other such sense technologies.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
   a plurality of sense electrodes; and
   a controller communicatively coupled to the plurality of sense electrodes, the controller configured to:
      receive a plurality of signals from the plurality of sense electrodes associated with an interaction with the touch sensor by an external object, the plurality of signals indicative of an amount of capacitance between the touch sensor and the external object;
      access a stored threshold value, the threshold value indicating a threshold magnitude of capacitance;
      determine a grounding status of the touch sensor based on a strength of a charge return path between the touch sensor and a ground;
      adjust the stored threshold value based on the determined grounding status of the touch sensor;
      after adjusting the stored threshold value, determine whether to process the interaction as a touch by the external object based on a comparison of the amount of capacitance with the adjusted threshold value; and
      after adjusting the stored threshold value based on the determined grounding status of the touch sensor:
         determine that the external object has not touched the touch sensor within a predetermined amount of time; and
         change the stored threshold value back to an original value, the original value comprising a value of the stored threshold value before it was adjusted based on the determined grounding status of the touch sensor.

2. The touch sensor of claim 1, wherein:
   the plurality of sense electrodes comprises a plurality of x-axis sense electrodes and a plurality of y-axis sense electrodes;
   the plurality of x-axis sense electrodes visually intersect the plurality of y-axis sense electrodes; and
   the visual intersections of the x-axis sense electrodes and the y-axis sense electrodes comprises a plurality of nodes.

3. The touch sensor of claim 2, wherein determining the grounding status of the touch sensor based on the strength of the charge return path between the touch sensor and ground comprises:
  determining that the external object has touched the touch sensor at a location that at least partially covers a particular one of the nodes;
  determining a maximum magnitude of a particular signal received from sense electrodes associated with the particular node; and
  calculating a new threshold value using the determined maximum magnitude of the particular signal received from sense electrodes associated with the particular node.

4. The touch sensor of claim 3, wherein:
  calculating the new threshold value comprises multiplying the determined maximum magnitude of the particular signal received from sense electrodes associated with the particular node by a predetermined percentage; and
  adjusting the stored threshold value based on the determined grounding status of the touch sensor comprises storing the calculated new threshold value as the stored threshold value.

5. The touch sensor of claim 1, wherein changing the stored threshold value back to the original value comprises
  periodically drifting, at a predetermined rate, the stored threshold value back to the original value.

6. The touch sensor of claim 1, wherein:
  adjusting the stored threshold value based on the determined grounding status of the touch sensor comprises replacing the stored threshold value with a new threshold value; and
  the stored threshold value is adjusted at a predetermined rate.

7. A method comprising:
  receiving, by a controller coupled to a touch sensor, a plurality of signals from a plurality of sense electrodes associated with an interaction with the touch sensor by an external object, the plurality of signals indicative of an amount of capacitance between the touch sensor and the external object;
  accessing, by the controller, a stored threshold value, the threshold value indicating a threshold magnitude of capacitance;
  determining, by the controller, a grounding status of the touch sensor based on a strength of a charge return path between the touch sensor and a ground;
  adjusting, by the controller, the stored threshold value based on the determined grounding status of the touch sensor;
  after adjusting the stored threshold value, determining, by the controller, whether to process the interaction as a touch by the external object based on a comparison of the amount of capacitance with the adjusted threshold value; and
  after adjusting the stored threshold value based on the determined grounding status of the touch sensor:
    determining, by the controller, that the external object has not touched the touch sensor within a predetermined amount of time; and
    changing, by the controller, the stored threshold value back to an original value, the original value comprising a value of the stored threshold value before it was adjusted based on the determined grounding status of the touch sensor.

8. The method of claim 7, wherein:
  the plurality of sense electrodes comprises a plurality of x-axis sense electrodes and a plurality of y-axis sense electrodes;
  the plurality of x-axis sense electrodes visually intersect the plurality of y-axis sense electrodes; and
  the visual intersections of the x-axis sense electrodes and the y-axis sense electrodes comprises a plurality of nodes.

9. The method of claim 8, wherein determining the grounding status of the touch sensor based on the strength of the charge return path between the touch sensor and ground comprises:
  determining that the external object has touched the touch sensor at a location that at least partially covers a particular one of the nodes;
  determining a maximum magnitude of a particular signal received from sense electrodes associated with the particular node; and
  calculating a new threshold value using the determined maximum magnitude of the particular signal received from sense electrodes associated with the particular node.

10. The method of claim 9, wherein:
  calculating the new threshold value comprises multiplying the determined maximum magnitude of the particular signal received from sense electrodes associated with the particular node by a predetermined percentage; and
  adjusting the stored threshold value based on the determined grounding status of the touch sensor comprises storing the calculated new threshold value as the stored threshold value.

11. The method of claim 7, wherein changing the stored threshold value back to the original value comprises
  periodically drifting, at a predetermined rate, the stored threshold value back to the original value.

12. The method of claim 7, wherein:
  adjusting the stored threshold value based on the determined grounding status of the touch sensor comprises replacing the stored threshold value with a new threshold value; and
  the stored threshold value is adjusted at a predetermined rate.

13. A touch-sensitive device comprising a controller, the controller communicatively coupled to a plurality of sense electrodes, the controller operable to:
  receive a plurality of signals from the plurality of sense electrodes associated with an interaction with the touch sensor by an external object, the plurality of signals indicative of an amount of capacitance between the touch-sensitive device and the external object;
  access a stored threshold value, the threshold value indicating a threshold magnitude of capacitance;
  determine a grounding status of the touch sensor based on a strength of a charge return path between the touch-sensitive device and a ground;
  adjust the stored threshold value based on the determined grounding status of the touch sensor;
  after adjusting the stored threshold value, determine whether to process the interaction as a touch by the external object based on a comparison of the amount of capacitance with the adjusted threshold value; and
  after adjusting the stored threshold value based on the determined grounding status of the touch sensor:
    determine that the external object has not touched the touch sensor within a predetermined amount of time; and change the stored threshold value back to an original value, the original value comprising a value of the stored threshold value before it was adjusted based on the determined grounding status of the touch sensor.

14. The touch-sensitive device of claim 13, wherein:
the plurality of sense electrodes comprises a plurality of x-axis sense electrodes and a plurality of y-axis sense electrodes;
the plurality of x-axis sense electrodes visually intersect the plurality of y-axis sense electrodes; and
the visual intersections of the x-axis sense electrodes and the y-axis sense electrodes comprises a plurality of nodes.

15. The touch-sensitive device of claim 14, wherein determining the grounding status of the touch sensor based on the strength of the charge return path between the touch sensor and ground comprises:
determining that the external object has touched the touch sensor at a location that at least partially covers a particular one of the nodes;
determining a maximum magnitude of a particular signal received from sense electrodes associated with the particular node; and
calculating a new threshold value using the determined maximum magnitude of the particular signal received from sense electrodes associated with the particular node.

16. The touch-sensitive device of claim 15, wherein:
calculating the new threshold value comprises multiplying the determined maximum magnitude of the particular signal received from sense electrodes associated with the particular node by a predetermined percentage; and
adjusting the stored threshold value based on the determined grounding status of the touch sensor comprises storing the calculated new threshold value as the stored threshold value.

17. The touch-sensitive device of claim 13, wherein changing the stored threshold value back to the original value comprises
periodically drifting, at a predetermined rate, the stored threshold value back to the original value.

18. The touch-sensitive device of claim 13, wherein:
adjusting the stored threshold value determined grounding status of the touch sensor comprises replacing the stored threshold value with a new threshold value; and the stored threshold value is adjusted at a predetermined rate.

19. The touch-sensitive device of claim 13, wherein determining the grounding status of the touch sensor based on the strength of the charge return path between the touch sensor and ground comprises analyzing shapes of one or more capacitance graphs.

20. The touch-sensitive device of claim 19, wherein analyzing shapes of one or more capacitance graphs comprises:
comparing a capacitance graph derived from plurality of signals indicative of an amount of capacitance between the touch-sensitive device and an external object with a plurality of stored capacitance graphs, the stored capacitance graphs comprising:
a grounded capacitance graph indicative of a typical touch when the touch-sensitive device is grounded; and
a floating capacitance graph indicative of a typical touch when the touch-sensitive device is floating;
determining, based on the comparison, that the touch-sensitive device is grounded if the capacitance graph matches the grounded capacitance graph; and
determining, based on the comparison, that the touch-sensitive device is floating if the capacitance graph matches the floating capacitance graph.

21. The touch sensor of claim 1, wherein the stored threshold value is adjusted after a predetermined number of interactions with the touch sensor by the external object.

22. The touch sensor of claim 1, wherein:
if the amount of capacitance is greater than the adjusted threshold value, the interaction with the touch sensor by the external object is processed as a touch by the external object; and
if the amount of capacitance is less than the adjusted threshold value, the interaction with the touch sensor by the external object is not processed as a touch by the external object.

23. The touch sensor of claim 1, wherein the stored threshold value is changed back to the original value only if it is determined that the external object has not touched the touch sensor within the predetermined amount of time.

* * * * *